(12) United States Patent
Koga et al.

(10) Patent No.: US 11,474,241 B2
(45) Date of Patent: Oct. 18, 2022

(54) DISTANCE MEASUREMENT DEVICE

(71) Applicant: Panasonic Intellectual Property Management Co., Ltd., Osaka (JP)

(72) Inventors: Toshihiro Koga, Osaka (JP); Kiyoshi Hibino, Kyoto (JP); Takashi Haruguchi, Kyoto (JP); Kazuhisa Ide, Osaka (JP); Masaomi Inoue, Osaka (JP); Masahiro Shiihara, Osaka (JP); Kouichi Bairin, Osaka (JP); Kouichi Kumamaru, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 948 days.

(21) Appl. No.: 16/157,995

(22) Filed: Oct. 11, 2018

(65) Prior Publication Data
US 2019/0120960 A1    Apr. 25, 2019

(30) Foreign Application Priority Data
Oct. 20, 2017  (JP) .............................. JP2017-203100

(51) Int. Cl.
| G01S 17/00 | (2020.01) |
| G01S 17/18 | (2020.01) |
| G01S 7/487 | (2006.01) |
| G01S 17/10 | (2020.01) |
| G01S 7/481 | (2006.01) |

(52) U.S. Cl.
CPC ............ *G01S 17/18* (2020.01); *G01S 7/4817* (2013.01); *G01S 7/4873* (2013.01); *G01S 7/4876* (2013.01); *G01S 17/10* (2013.01)

(58) Field of Classification Search
USPC ......................................................... 356/5.03
See application file for complete search history.

(56) References Cited

U.S. PATENT DOCUMENTS

| 7,532,312 B2 | 5/2009 | Nakamura |
| 9,377,533 B2 * | 6/2016 | Smits ...................... G01S 17/42 |

(Continued)

FOREIGN PATENT DOCUMENTS

| JP | 2006-322834 A | 11/2006 |
| JP | 4894360 B | 3/2012 |

(Continued)

*Primary Examiner* — James R Hulka
(74) *Attorney, Agent, or Firm* — McDermott Will & Emery LLP

(57) ABSTRACT

There is provided a distance measurement device that can appropriately detect a distance to an object regardless of the distance. The distance measurement device includes a laser light source, a photodetector, and a controller. The controller performs a long-distance routine that detects timing for receiving light when an object is at a long distance, and a short-distance routine that detects the timing for receiving light when the object is at a short distance, based on a detection signal output from the photodetector during one distance measurement operation. The controller then selects one of a detection result of the timing for receiving light by the long-distance routine and a detection result of the timing for receiving light by the short-distance routine, and calculates the distance to the object irradiated with projection light based on the selected detection result.

6 Claims, 15 Drawing Sheets

(56) References Cited

U.S. PATENT DOCUMENTS

| | | | |
|---|---|---|---|
| 10,578,741 B2* | 3/2020 | Matsuo | G01S 17/10 |
| 10,732,281 B2* | 8/2020 | LaChapelle | G01S 7/497 |
| 2016/0041266 A1* | 2/2016 | Smits | G01S 7/497 |
| | | | 356/5.01 |
| 2017/0219695 A1* | 8/2017 | Hall | G01S 17/10 |
| 2017/0242126 A1 | 8/2017 | Matsuo et al. | |
| 2018/0259645 A1* | 9/2018 | Shu | G01S 17/42 |
| 2018/0284224 A1* | 10/2018 | Weed | G01S 7/497 |
| 2018/0284225 A1* | 10/2018 | Weed | G01S 7/4817 |
| 2018/0284226 A1* | 10/2018 | LaChapelle | G01W 1/14 |
| 2018/0284278 A1* | 10/2018 | Russell | G01S 17/89 |
| 2018/0284279 A1* | 10/2018 | Campbell | G01S 7/4817 |

FOREIGN PATENT DOCUMENTS

| | | |
|---|---|---|
| JP | 2012-159330 A | 8/2012 |
| WO | 2016/075885 A1 | 5/2016 |

* cited by examiner

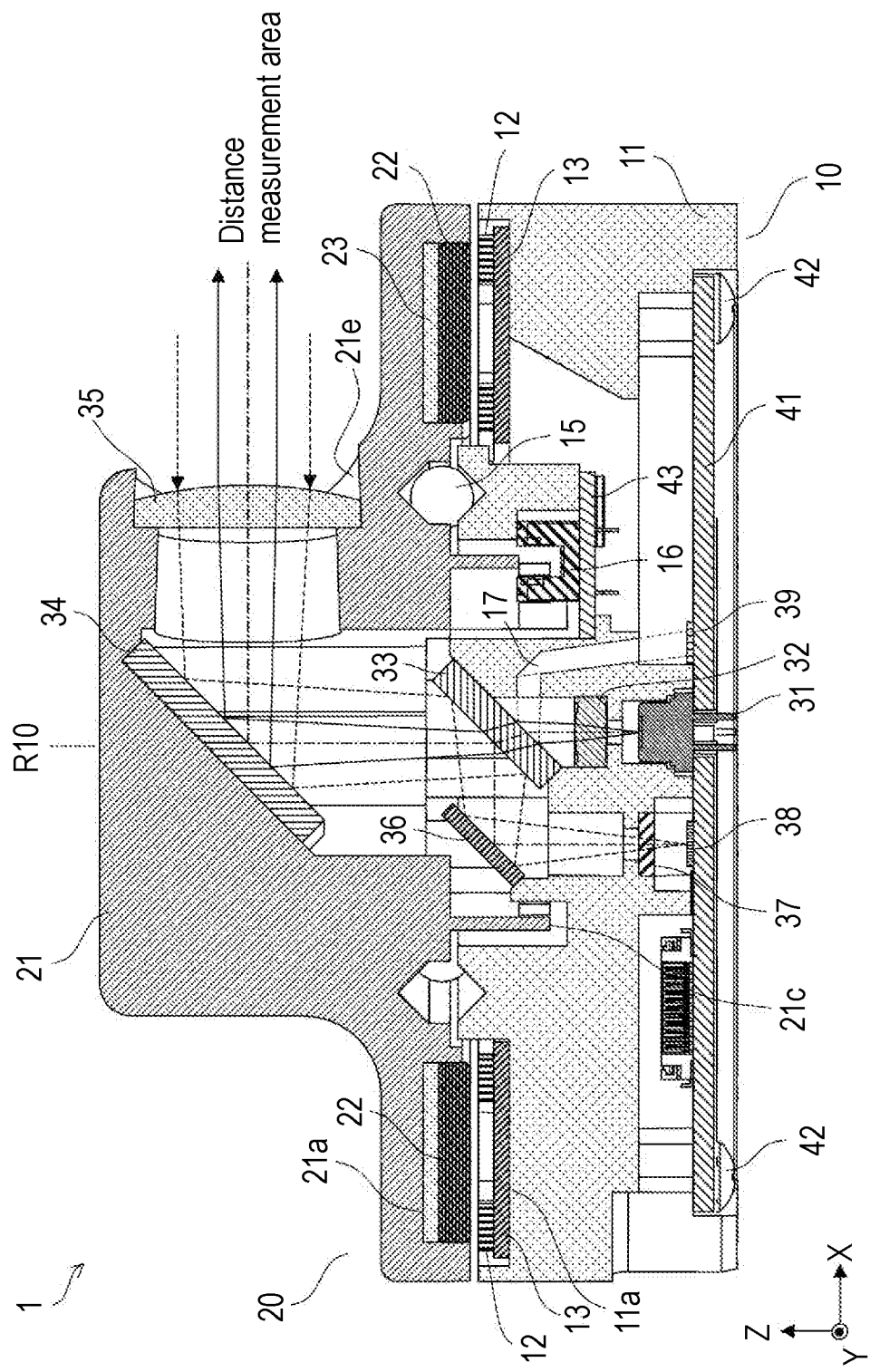

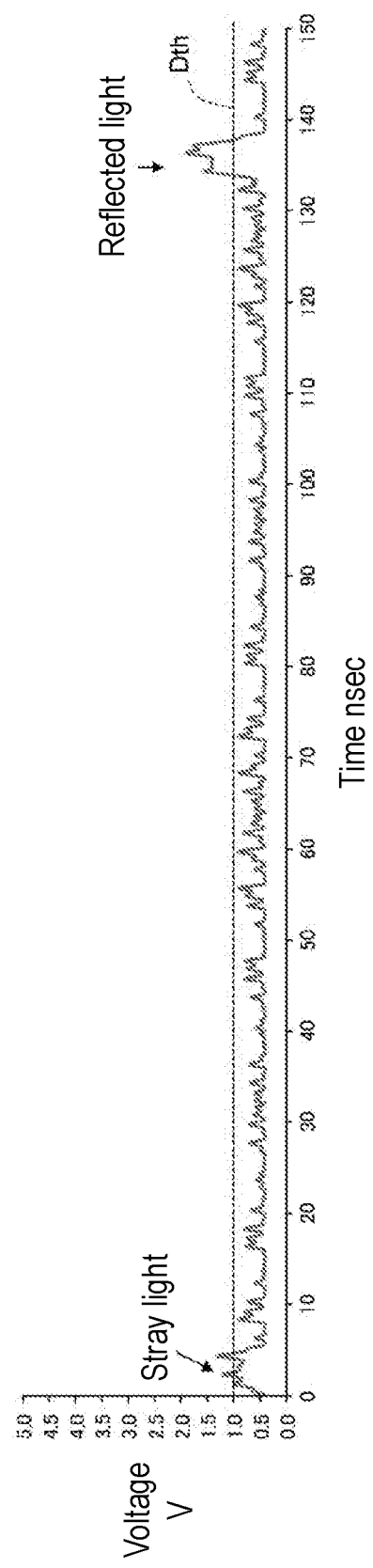

DISTANCE MEASUREMENT DEVICE

BACKGROUND

1. Technical Field

The present disclosure relates to a distance measurement device that measures a distance to an object by using light.

2. Description of the Related Art

Conventionally, distance measurement devices for measuring a distance to an object by using light are mounted on various devices. For example, a system using a triangulation method has been known as a system of measuring a distance using light. This system measures a distance to an object based on an angle between a light emission direction and a traveling direction of reflected light generated by reflection of the light on the object. When a distance to an object is long, however, it is difficult for this system to accurately measure the distance. To solve such a problem, it is possible to employ a system of measuring a distance to an object based on time required from light emission to receiving of reflected light (runtime).

The following PTL 1 describes a distance measurement device that measures a distance to an object based on runtime. While the distance measurement device emits laser light for a predetermined number of times toward an identical direction, the distance measurement device integrates all light-receiving signals output from a light receiver by that time, and calculates an integration signal. Then, when it is determined that a peak of the integration signal is caused by reflected light from a reflecting object, emission of the laser light is stopped even if emission of the laser light for the predetermined number of times is being performed. This can prevent the laser light from being emitted uselessly.

CITATION LIST

Patent Literature

PTL 1: Japanese Patent No. 4894360

SUMMARY

It is necessary for the distance measurement device that measures a distance to an object based on runtime to appropriately detect timing for receiving reflected light generated by reflection from the object. However, light quantity of reflected light received by the distance measurement device is attenuated in inverse proportion to the square of the distance to the object. Therefore, when the distance to the object becomes longer, a detection signal of the reflected light will become smaller, making it difficult to detect the timing for receiving the reflected light appropriately under the influence of internal stray light, external light, noise, and other factors.

In view of such a problem, an object of the present disclosure is to provide a distance measurement device that can appropriately detect a distance to an object regardless of the distance.

A main aspect of the present disclosure relates to a distance measurement device. The distance measurement device according to this aspect includes a light source that emits projection light for distance measurement, a photodetector that receives reflected light generated by reflection from a distance measurement area, and a controller. Here, the controller performs a long-distance routine that detects timing for receiving light when an object is at a long distance and a short-distance routine that detects the timing for receiving light when the object is at a short distance based on a detection signal output from the photodetector during one distance measurement operation. The controller then selects one of a detection result of the timing for receiving light by the long-distance routine and a detection result of the timing for receiving light by the short-distance routine, and calculates the distance to the object irradiated with the projection light based on the selected detection result.

Since one of the detection result of the long-distance routine and the detection result of the short-distance routine is selected and the distance to the object is calculated, the distance measurement device according to the present aspect can appropriately detect the distance to the object regardless of the distance to the object.

As described above, the distance measurement device according to the present disclosure can appropriately detect the distance to the object regardless of the distance.

Effects or meanings of the present disclosure will be further clarified in the following description of the exemplary embodiment. However, the following exemplary embodiment is illustrative only for implementation of the present disclosure, and the present disclosure is not at all restrictive of the following exemplary embodiment.

BRIEF DESCRIPTION OF THE DRAWINGS

FIG. 3 is a cross-sectional view showing the configuration of the distance measurement device according to the exemplary embodiment;

FIG. 6A is a diagram showing one example of a detection signal output from a photodetector;

DETAILED DESCRIPTION

Hereinafter, an exemplary embodiment of the present disclosure will be described with reference to the drawings. For the sake of convenience, X, Y and Z axes perpendicular to one another are added to the respective drawings. A direction of the Z axis is a height direction of distance measurement device 1.

Figure 1:
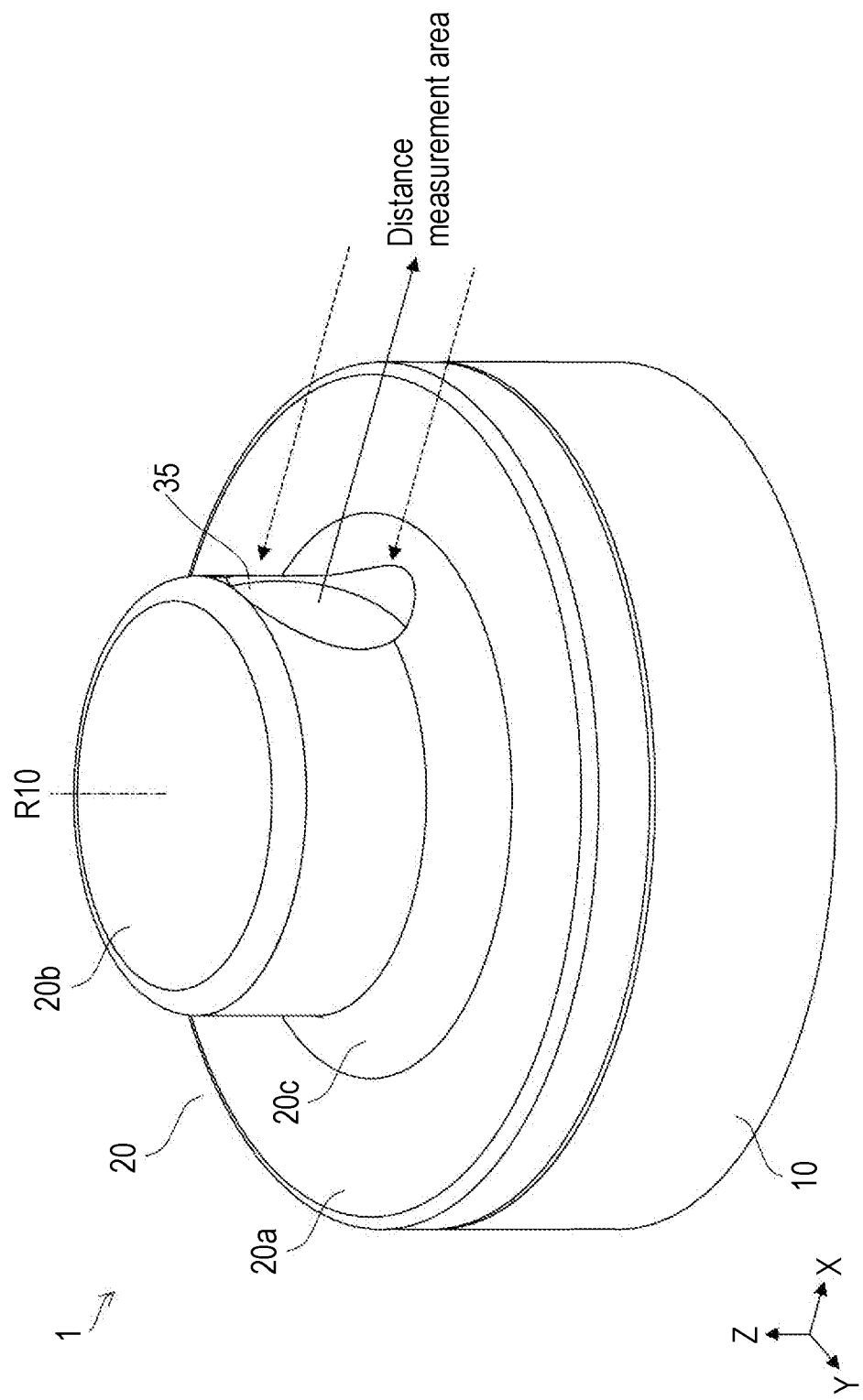
FIG. 1 is a perspective view showing a configuration of a distance measurement device according to an exemplary embodiment.

FIG. 1 is a perspective view showing a configuration of distance measurement device 1.

As shown in FIG. 1, distance measurement device 1 includes fixed part 10 formed in a cylindrical shape and rotating part 20 rotatably disposed on fixed part 10. Rotating part 20 is constituted by large diameter part 20a having a substantially same diameter as fixed part 10, small diameter part 20b having a smaller diameter than large diameter part 20a, and inclined part 20c connecting large diameter part 20a and small diameter part 20b. Large diameter part 20a and small diameter part 20b are both formed in a cylindrical shape. Fixed part 10, and large diameter part 20a and small diameter part 20b of rotating part 20 are coaxially disposed. Imaging lens 35 is disposed on a side surface of small diameter part 20b so as to be externally exposed. Laser light (projection light) is projected from imaging lens 35 to a distance measurement area. Imaging lens 35 constitutes a lens part taking in reflected light generated by reflection from the distance measurement area.

Rotating part 20 rotates about rotating axis R10 that is parallel to the Z axis and passes through a center of small diameter part 20b. When rotating part 20 rotates, an optical axis of the laser light projected from imaging lens 35 rotates about rotating axis R10. The distance measurement area is thus rotated accordingly. Distance measurement device 1 measures a distance to an object present in the distance measurement area based on a time difference (runtime) between timing when the laser light is projected on the distance measurement area and timing when reflected light of the laser light from the distance measurement area is received. Specifically, the time difference is multiplied by the speed of light and divided by 2, so that the distance to the object is calculated. As rotating part 20 rotates once about rotating axis R10 as described above, distance measurement device 1 can measure the distance to an object present in a range of 360° around distance measurement device 1.

Figure 2:
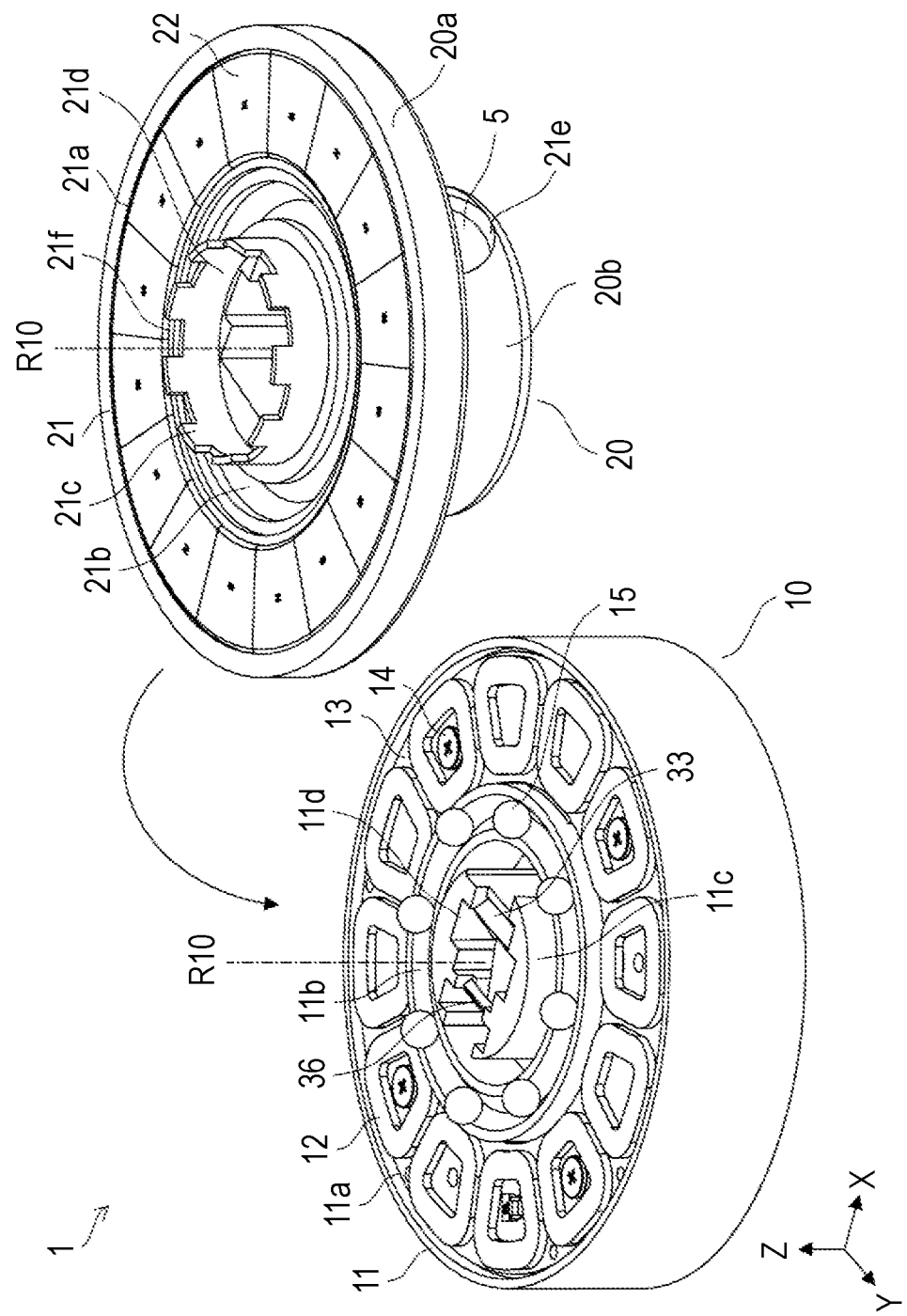
FIG. 2 is a perspective view showing the configuration of the distance measurement device according to the exemplary embodiment in a state where a fixed part and a rotating part are separated from each other.

FIG. 2 is a perspective view showing the configuration of distance measurement device 1 in a state where fixed part 10 and rotating part 20 are separated from each other.

As shown in FIG. 2, fixed part 10 includes support base 11 formed in a cylindrical shape, coils 12, yoke 13, and bearing balls 15. Support base 11 is composed of, for example, a resin. Recess 11a is formed in an upper surface of support base 11 along a circumferential direction about rotating axis R10. Yoke 13, which is a thin plate, is fitted into recess 11a. Yoke 13 has a disc shape with the center part removed. Yoke 13 is fixed on support base 11 by screws 14.

In addition, a plurality of coils 12 are circumferentially arranged on an upper surface of yoke 13. Here, 12 coils 12 are mounted on the upper surface of yoke 13. Yoke 13 constitutes a motor for rotating part 20 with magnets 22 on a side of rotating part 20.

On an upper surface of support base 11, guide trench 11b with a fixed depth is formed inside of recess 11a to extend circumferentially. A shape of guide trench 11b cut along a plane perpendicular to the circumferential direction is a V-shape. Guide trench 11b extends circumferentially. Guide trench 11b is used for circumferentially guiding bearing balls 15. A plurality of bearing balls 15 is fitted into guide trench 11b. A spacer for keeping a constant distance between bearing balls 15 may be further fitted into guide trench 11b.

Protrusion 11c having a cylindrical shape is formed in a center part of support member 21, and recess 11d is formed in protrusion 11c. Optical members constituting an optical system to be described later are disposed in recess 11d. FIG. 2 shows beam splitter 33 and mirror 36 as the optical members.

FIG. 2 shows rotating part 20 upside down. Rotating part 20 includes support member 21 and magnets 22. Although not shown in FIG. 2, yoke 23 (see FIG. 3) is also placed in rotating part 20. In the state of FIG. 2, yoke 23 is covered by magnets 22.

Recess 21a is formed in large diameter part 20a of rotating part 20 along the circumferential direction about rotating axis R10. Yoke 23, which is a thin plate (see FIG. 3), is fitted into recess 21a. Yoke 23 has a disc shape with the center part removed. Yoke 23 is fixed on large diameter part 20a by thermosetting adhesives or integral molding of metal and resin.

In addition, a plurality of magnets 22 is circumferentially arranged so as to cover yoke 23. These magnets 22 are arranged in a manner that polarities of adjacent magnets 22 are opposite to each other. Here, 16 magnets 22 are mounted so as to cover yoke 23. Magnets 22 constitute the motor for rotating part 20 with coils 12 on a side of fixed part 10.

In support member 21, guide trench 21b with a fixed depth is formed inside of recess 21a to extend circumferentially. The shape of guide trench 21b cut along a plane perpendicular to the circumferential direction is a V-shape. Guide trench 21b extends circumferentially. Guide trench 21b is used for circumferentially guiding bearing balls 15 with guide trench 11b on the side of fixed part 10. When rotating part 20 is placed on fixed part 10 as shown in FIG. 1, bearing balls 15 are sandwiched between guide trench 11b on the side of fixed part 10 and guide trench 21b on the side of rotating part 20. Rotating part 20 is thus supported by fixed part 10 so as to be rotatable about rotating axis R10.

Wall 21c having a cylindrical shape is formed in a center part of support base 11, and opening 21d is formed inside of wall 21c. Rotating mirror 34 to be described later (see FIG.

3) is placed in opening 21d. Opening 21d is connected to opening 21e formed in the side surface of small diameter part 20b. Imaging lens 35 is placed in opening 21e. Cut-away parts 21f are circumferentially formed in wall 21c at fixed intervals. Cut-away part 21f is used for detecting the rotation state of rotating part 20.

When rotating part 20 is placed on fixed part 10 as described above, rotating part 20 is supported by fixed part 10 through bearing balls 15 so as to be rotatable about rotating axis R10. In this state, magnets 22 arranged on the side of rotating part 20 respectively face coils 12 arranged on the side of fixed part 10. In this way, the motor for driving rotating part 20 in a rotation direction is configured.

In addition, in this state, magnetic attraction force is generated between magnets 22 on the side of rotating part 20 and yoke 13 on the side of fixed part 10. This magnetic attraction force attracts rotating part 20 to fixed part 10, thus keeping a support state of rotating part 20 by fixed part 10. That is, yoke 13 constitutes a magnetic part generating magnetic attraction force for preventing fall-off of rotating part 20 between yoke 13 and magnets 22. Support base 11 may be composed of a magnetic body for the purpose of generating the magnetic attraction force.

FIG. 3 is a cross-sectional view showing the configuration of distance measurement device 1. FIG. 3 is a cross-sectional view obtained by cutting distance measurement device 1 shown in FIG. 1 at a center position in a direction of the Y axis along a plane parallel to an X-Z plane. In FIG. 3, laser light (projection light) emitted from laser light source 31 to the distance measurement area is shown by solid lines, whereas reflected light generated by reflection from the distance measurement area is shown by broken lines. A one-dot chain line drawn in the optical system shows the optical axis of the optical system.

As shown in FIG. 3, distance measurement device 1 includes, as components of the optical system, laser light source 31, relay lens 32, beam splitter 33, rotating mirror 34, imaging lens 35, mirror 36, filter 37, and photodetectors 38, 39. Laser light source 31 and photodetectors 38, 39 are placed on circuit board 41. Relay lens 32, beam splitter 33, mirror 36, and filter 37 are placed in support base 11 on the side of fixed part 10. Rotating mirror 34 and imaging lens 35 are placed in support member 21 of rotating part 20.

Laser light source 31 emits laser light of a predetermined wavelength. Laser light source 31 is, for example, a semiconductor laser. An emission optical axis of laser light source 31 is parallel to the Z axis. Laser light source 31 is placed on circuit board 41 placed on a lower surface of support base 11. Circuit board 41 is placed on the lower surface of support base 11 by screws 42. A radiation angle of the laser light emitted from laser light source 31 is reduced by relay lens 32, and then the laser light enters beam splitter 33. The laser light is transmitted through beam splitter 33 to be directed to rotating mirror 34.

Figure 4A:
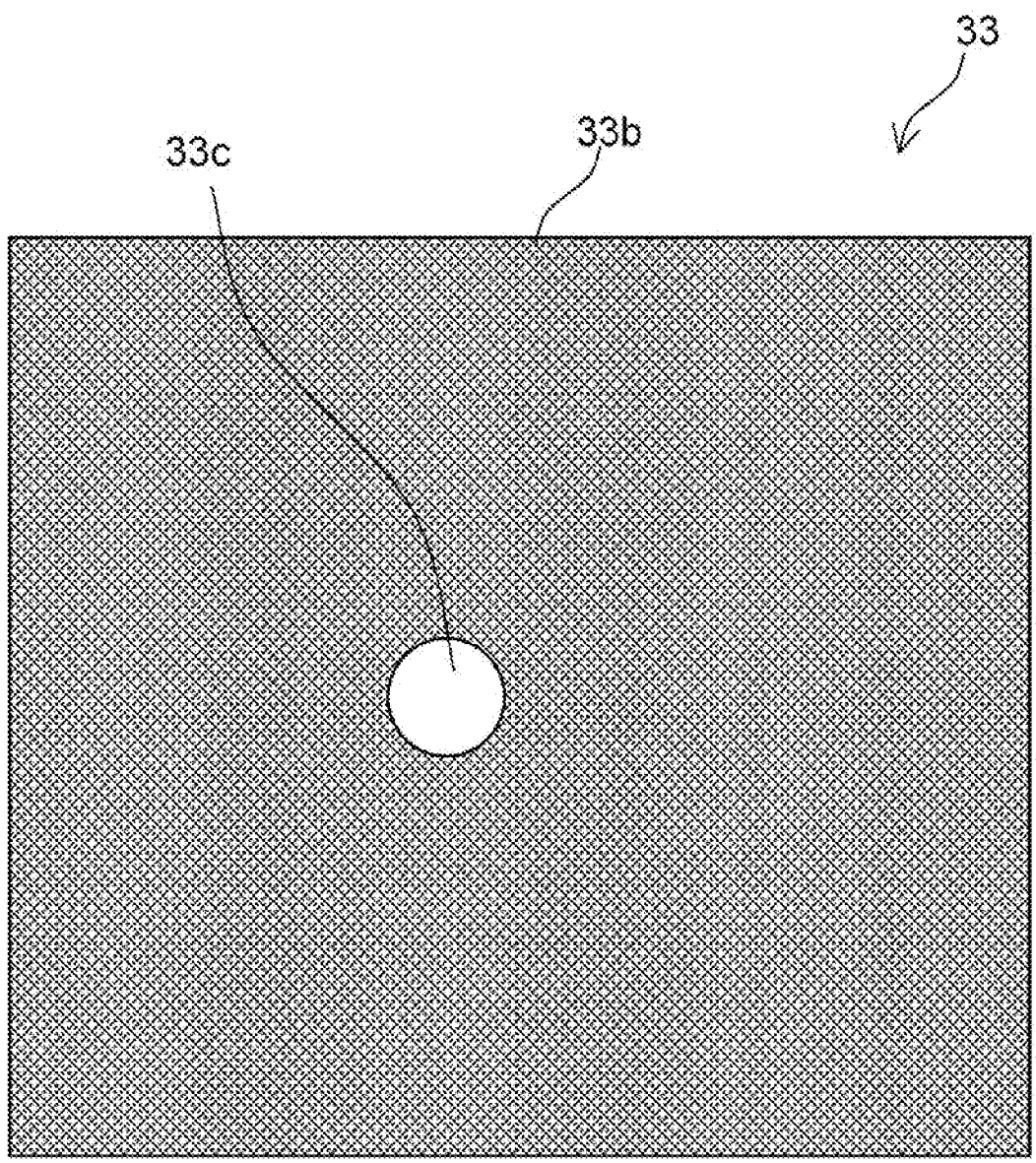
FIG. 4A is a plan view showing a configuration of a beam splitter according to the exemplary embodiment.
Figure 4B:
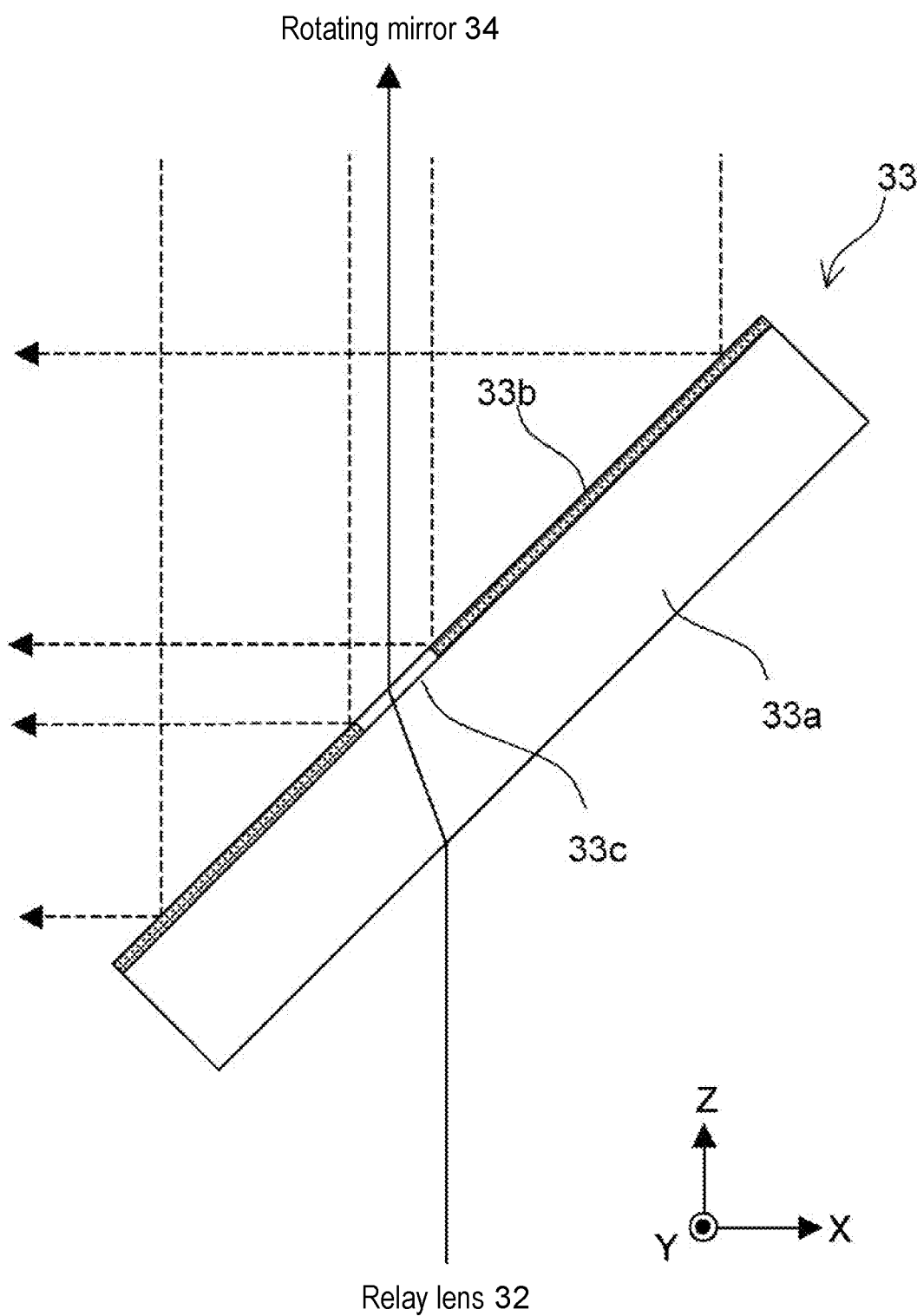
FIG. 4B is a side view showing the configuration of the beam splitter according to the exemplary embodiment.

FIG. 4A is a plan view showing a configuration of beam splitter 33. FIG. 4B is a side view showing the configuration of beam splitter 33.

As shown in FIGS. 4A and 4B, beam splitter 33 is configured by forming reflection film 33b on a surface of transparent substrate 33a with a fixed thickness. Reflection film 33b is formed on an overall area other than hole 33c having a circular shape. Hole 33c is set to be slightly larger than an area through which the laser light entering from a side of relay lens 32 passes. Consequently, substantially all the laser light entering from the side of relay lens 32 is transmitted through beam splitter 33 to be directed to rotating mirror 34. Beam splitter 33 is disposed so as to be inclined to the Z axis by 45°.

Returning to FIG. 3, rotating mirror 34 is a plate-shaped total reflection mirror. Rotating mirror 34 is placed in support member 21 in a manner that a reflecting surface opposes beam splitter 33. The reflecting surface of rotating mirror 34 is a plane. Rotating mirror 34 is disposed in a manner that the reflecting surface is inclined to the Z axis by 45°. The optical axis of the laser light having been transmitted through beam splitter 33 is bent by 90° by rotating mirror 34. That is, the laser light is reflected by rotating mirror 34 in the direction of imaging lens 35.

Imaging lens 35 is placed in a manner that an optical axis is parallel to the X axis. Imaging lens 35 converts the laser light entering from a side of rotating mirror 34 into substantially parallel light and projects the substantially parallel light to the distance measurement area. Imaging lens 35 does not have to be constituted by one lens, and may be constituted by a plurality of lenses in combination.

When an object is present in the distance measurement area, the laser light projected on the distance measurement area is reflected by the object to be directed again to imaging lens 35. Reflected light generated by reflection from the object is thus taken in by imaging lens 35. While being transmitted through imaging lens 35, the reflected light is subjected to a convergence action by imaging lens 35. The reflected light having been taken in by imaging lens 35 is reflected by rotating mirror 34 to enter beam splitter 33.

With reference to FIG. 4B, the reflected light entering beam splitter 33 is reflected by reflection film 33b in a negative direction of the X axis. FIG. 4B shows the reflected light by broken lines. The reflected light entering hole 33c is not reflected and is transmitted through beam splitter 33. The reflected light entering the area of reflection film 33b other than hole 33c is reflected by reflection film 33b in the negative direction of the X axis to be directed to mirror 36. For the sake of convenience, while the reflected light is shown as parallel light in FIG. 4B, the reflected light is actually converging light.

Returning to FIG. 3, the reflected light generated by reflection by beam splitter 33 is reflected by mirror 36 in the negative direction of the Z axis. Mirror 36 is a total reflection mirror having a reflecting surface on one surface of mirror 36. Mirror 36 is placed in a manner that the reflecting surface is inclined to the Z axis by 45°. The reflected light generated by reflection by mirror 36 is transmitted through filter 37 to converge on photodetector 38.

Filter 37 is configured to transmit light of a wavelength band of the laser light emitted from laser light source 31 and to block light of other wavelength bands. A pinhole having a substantially same diameter as a beam diameter of reflected light entering filter 37 may be formed in an incident surface or an emitting surface of filter 37. The pinhole can remove more stray light. Photodetector 38 outputs a detection signal based on received light quantity. When the pinhole is formed in filter 37, the optical system may be adjusted in a manner that the pinhole is positioned at a focus position of imaging lens 35.

In the configuration of FIG. 3, in addition to circuit board 41, sub-board 43 is placed in support base 11 and detector 16 is placed on sub-board 43. Detector 16 includes a light emitting part and a light receiving part opposing the light emitting part. Detector 16 is disposed in a manner that wall 21c on the side of rotating part 20 shown in FIG. 2 is positioned in a gap between the light emitting part and the light receiving part.

As rotating part 20 rotates and cut-away part 21f formed in wall 21c is positioned between the light emitting part and the light receiving part of detector 16, light from the light emitting part is received by the light receiving part, so that a high-level signal is output from detector 16. When cut-away part 21f passes, the light from the light emitting part is blocked by wall 21c and a signal from detector 16 falls to a low-level. Consequently, when rotating part 20 rotates, a pulse signal having a period based on a rotational speed is output from detector 16. This signal enables the rotation state of rotating part 20 to be detected. Sub-board 43 is electrically connected to circuit board 41 by signal lines (not shown).

Guide hole 17 for guiding the laser light reflected by an incident surface of beam splitter 33 (surface on a side of laser light source 31) to photodetector 39 is formed in support base 11. Most of the projection light emitted from laser light source 31 is transmitted through the incident surface of beam splitter 33, and part of the projection light is reflected by the incident surface and enters guide hole 17. An internal surface of guide hole 17 is preferably a mirror surface such that it is possible to guide more projection light to photodetector 39.

The projection light having a beam diameter slightly wider than hole 33c shown in FIG. 4B may enter reflection film 33b, and a portion of the transmitted light extruded from hole 33c may be reflected by reflection film 33b and guided to guide hole 17 of FIG. 3. This allows more projection light to be guided to photodetector 39. As will be described later, the detection signal from photodetector 39 is used for prescribing timing for emitting the projection light.

In that connection, in order to measure the distance to the object present in the distance measurement area, it is necessary to accurately detect timing for projecting the projection light and timing for receiving the reflected light. Here, intensity of the reflected light received by photodetector 38 decreases as the distance to the object increases. That is, the intensity of the reflected light received by photodetector 38 is attenuated in inverse proportion to the square of the distance to the object. Therefore, in distance measurement, it is necessary to accurately detect timing for receiving such weak reflected light.

Figure 5A:
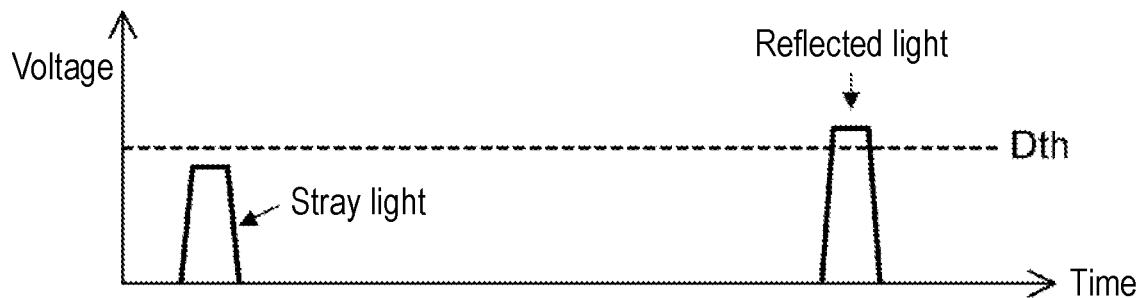
FIG. 5A is a diagram showing one example of a method for detecting reflected light using a threshold.

FIG. 5A is a diagram showing one example of a method for detecting the reflected light using threshold Dth. In FIG. 5A, a horizontal axis is elapsed time after the projection light is emitted from laser light source 31, whereas a vertical axis is a voltage value of the detection signal output from photodetector 38.

Part of the projection light emitted from laser light source 31 is reflected by, for example, the incident surface of imaging lens 35 (surface on a negative side of the X-axis) shown in FIG. 3 and becomes internal stray light. This internal stray light enters photodetector 38. Such internal stray light will be generated even if an antireflection film is formed on the incident surface of imaging lens 35. Therefore, as shown in FIG. 5A, a waveform based on the internal stray light is generated besides a waveform based on the reflected light in the detection signal from photodetector 38. In this case, as shown in FIG. 5A, by setting threshold Dth between a peak value of the internal stray light and a peak value of the reflected light, timing for receiving the reflected light can be acquired. For example, it is possible to acquire timing when the detection signal exceeds threshold Dth in a rising direction as timing for receiving the reflected light.

Figure 5B:
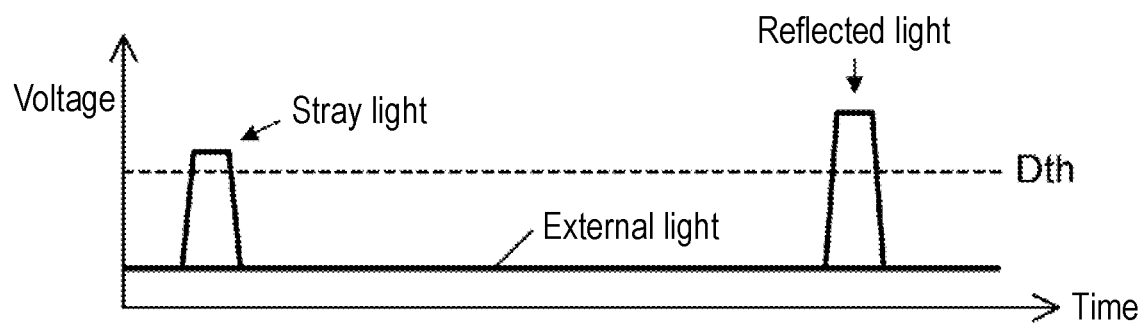
FIG. 5B is a diagram showing another example of the method for detecting the reflected light using the threshold.

However, besides the reflected light, natural light (external light) taken in from the outside can enter photodetector 38 with high light quantity. In this case, as shown in FIG. 5B, a signal component based on external light is superimposed on the detection signal from photodetector 38, and the waveform of the internal stray light and the waveform of the reflected light are elevated by a level of the signal component of external light. Therefore, the waveform of the internal stray light will exceed threshold Dth, and depending on threshold Dth, it will become impossible to appropriately detect timing for receiving the reflected light.

Figure 5C:
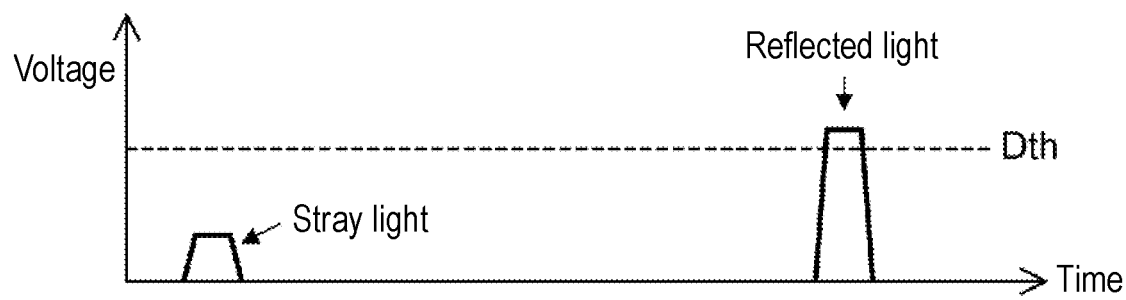
FIG. 5C is a diagram showing another example of the method for detecting the reflected light using the threshold.
Figure 5D:
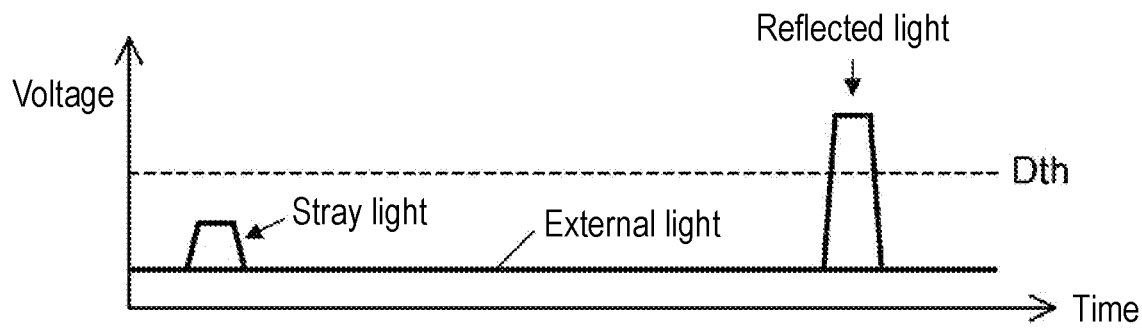
FIG. 5D is a diagram showing another example of the method for detecting the reflected light using the threshold.

Such a problem can be solved, for example, as shown in FIG. 5C, by further reducing the level of the internal stray light and increasing a difference between the waveform peak value based on the reflected light and the waveform peak value based on the internal stray light. Here, the internal stray light can be reduced by, for example, increasing the performance of the antireflection film to be formed on the incident surface of imaging lens 35. With this configuration, as shown in FIG. 5D, even when the signal component of external light is superimposed, it is possible to inhibit that the waveform of the internal stray light exceeds threshold Dth. With threshold Dth, timing for receiving the reflected light can be appropriately detected.

Figure 5E:
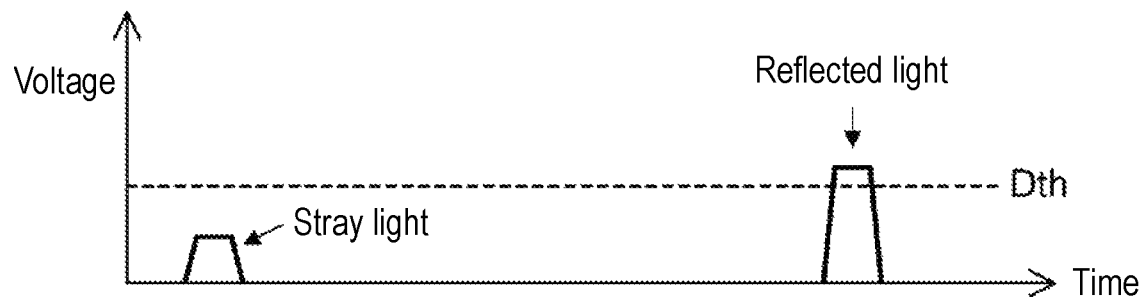
FIG. 5E is a diagram showing another example of the method for detecting the reflected light using the threshold.
Figure 5F:
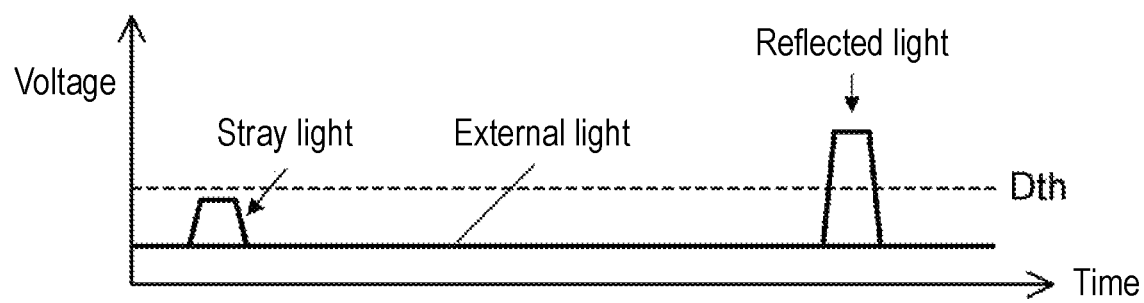
FIG. 5F is a diagram showing another example of the method for detecting the reflected light using the threshold.

However, from a viewpoint of reducing power consumption and avoiding an influence on a human body, it is desired to minimize an output level of the projection light. When the output level of the projection light is reduced from such a viewpoint, light quantity of the received reflected light decreases as the output level of the projection light is reduced. Therefore, the peak value of the reflected light in the detection signal decreases as shown in FIG. 5E and approaches the peak value of the stray light. In this case, when the threshold is set as shown in FIG. 5E, even when the signal component of external light is superimposed as shown in FIG. 5F, the waveform of the internal stray light does not exceed threshold Dth.

Figure 5G:
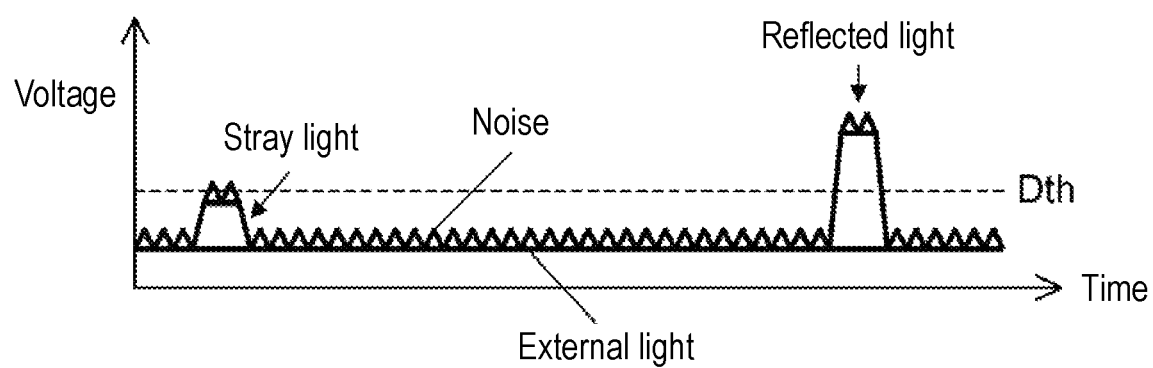
FIG. 5G is a diagram showing another example of the method for detecting the reflected light using the threshold.

However, a random noise component generated in a circuit may also be superimposed on the detection signal from photodetector 38. In this case, as shown in FIG. 5G, when the noise component is superimposed on the waveform of the internal stray light, it is possible that the waveform of the internal stray light exceeds threshold Dth. In such a case, timing for receiving the reflected light cannot be detected appropriately.

Figure 6B:
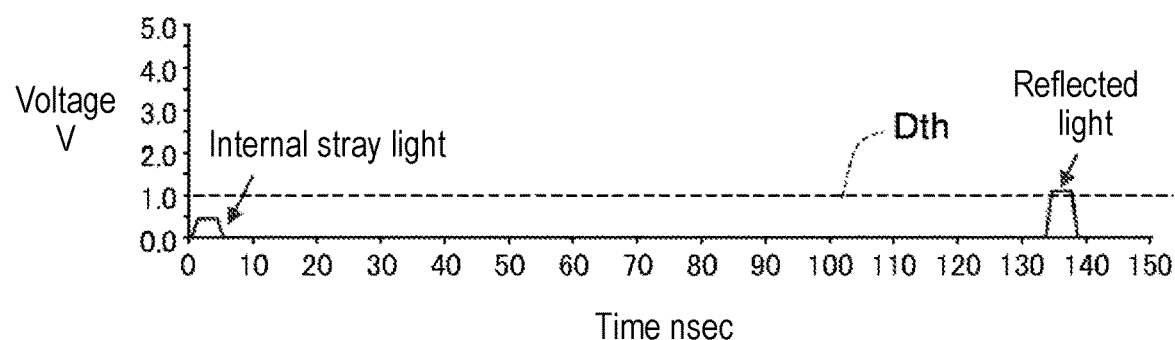
FIG. 6B is a diagram showing the detection signal of FIG. 6A separated into signal components of internal stray light and a reflected light signal.
Figure 6C:
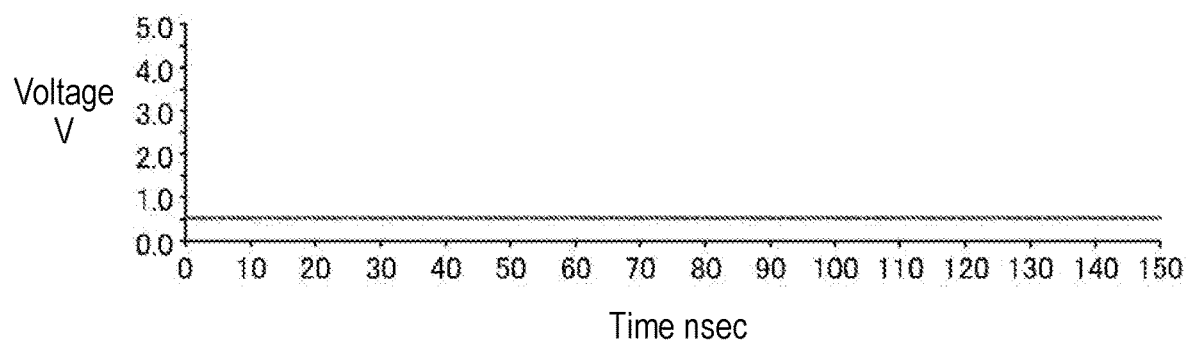
FIG. 6C is a diagram showing the detection signal of FIG. 6A separated into a signal component of external light and a dark current.
Figure 6D:
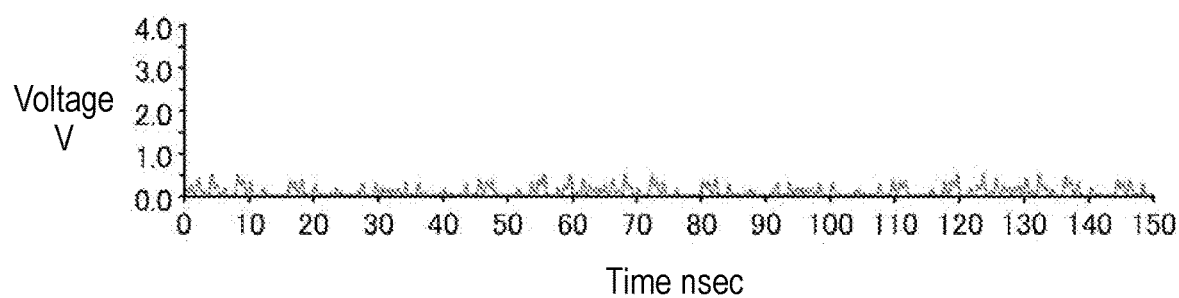
FIG. 6D is a diagram showing the detection signal of FIG. 6A separated into a noise component.

FIG. 6A is a diagram showing one example of the detection signal output from photodetector 38. FIGS. 6B, 6C, and 6D are diagrams showing the detection signal of FIG. 6A separated into signal components of internal stray light and reflected light, a signal component of external light and a dark current, and a noise component, respectively. In FIGS. 6A to 6D, a horizontal axis is elapsed time after the projection light is emitted, whereas a vertical axis is a voltage value of each signal. Here, the signal component based on a dark current of photodetector 38 is considered, besides internal stray light, external light, and noise.

In the detection signal of FIG. 6A, as shown in FIG. 6B, timing for receiving the reflected light can be acquired by setting threshold Dth at a voltage of about 1.0 V. However, with threshold Dth, when the signal component based on external light and a dark current as shown in FIG. 6C and the signal component based on noise as shown in FIG. 6D are superimposed on the detection signal, the waveform based on the internal stray light as well as the waveform based on the reflected light exceed threshold Dth as shown in FIG. 6A, making it impossible to detect timing for receiving the reflected light appropriately.

Therefore, the present exemplary embodiment achieves appropriate detection of timing for receiving weak reflected light by using the following method.

In the present exemplary embodiment, during one distance measurement operation, a long-distance routine to detect timing for receiving light when an object is at a long distance and a short-distance routine to detect timing for receiving light when an object is at a short distance are performed based on the detection signal output from photodetector 38. Then, one of a detection result of timing for receiving light by the long-distance routine and a detection result of timing for receiving light by the short-distance routine is selected. Based on the selected detection result, the distance to the object irradiated with the projection light is calculated.

Figure 7A:
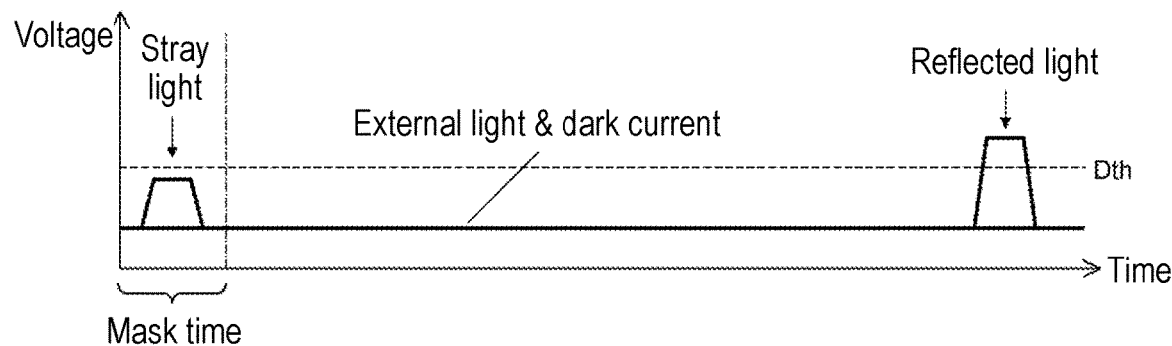
FIG. 7A is a diagram schematically showing the method for detecting the reflected light in a long-distance routine according to the exemplary embodiment.
Figure 7B:
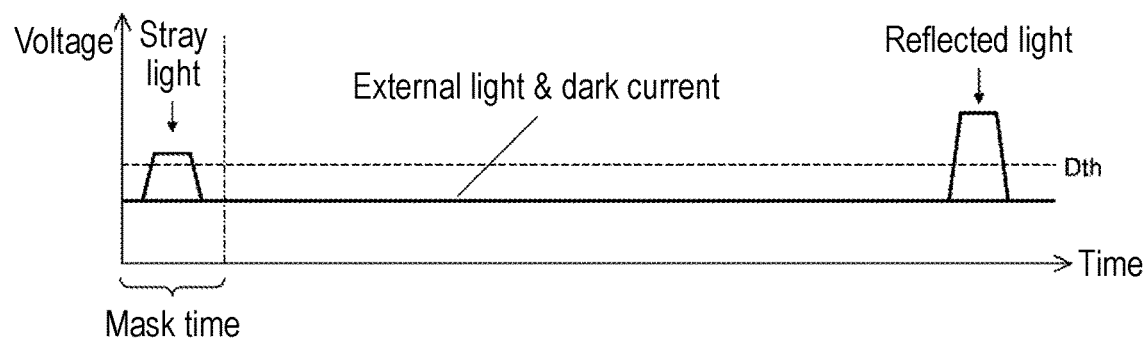
FIG. 7B is a diagram schematically showing the method for detecting the reflected light in the long-distance routine according to the exemplary embodiment.
Figure 7C:
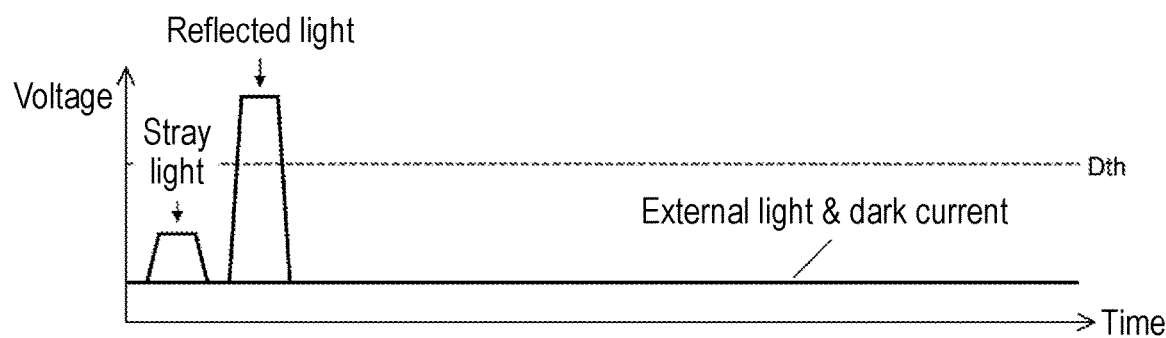
FIG. 7C is a diagram schematically showing the method for detecting the reflected light in a short-distance routine according to the exemplary embodiment.

FIGS. 7A and 7B are diagrams schematically showing the method for detecting the reflected light by the long-distance routine. FIG. 7C is a diagram schematically showing the method for detecting the reflected light by the short-distance routine.

When an object is at a short distance, since light quantity of the reflected light generated by reflection by the object and received by photodetector 38 is large, as shown in FIG. 7C, the peak value of the detection signal based on the reflected light is large. Therefore, the difference between the peak value of the detection signal based on internal stray light and the peak value of the detection signal based on the reflected light is large. In this case, if threshold Dth is set as shown in FIG. 7C, the waveform based on the internal stray light does not exceed threshold Dth even when the signal component based on external light, dark current, and noise is superimposed.

In the short-distance routine, threshold Dth is set from such a viewpoint, and timing for receiving the reflected light is detected. Threshold Dth in the short-distance routine is set at a level at which, even if the signal component based on external light, dark current, and noise is superimposed on the detection signal at the maximum level that can be assumed, the waveform based on the internal stray light does not exceed threshold Dth, and the waveform of the reflected light can be appropriately detected.

When an object is at a long distance, since light quantity of the reflected light generated by reflection by the object and received by photodetector 38 is small, as shown in FIG. 7A, the peak value of the detection signal based on the reflected light is small. Therefore, the difference between the peak value of the detection signal based on internal stray light and the peak value of the detection signal based on the reflected light is small. Therefore, in this case, even if threshold Dth is set as shown in FIG. 7A, the waveform based on internal stray light can exceed threshold Dth when the signal component based on external light and dark current, or the signal component based on noise is superimposed as shown in FIG. 7B.

Therefore, in the long-distance routine, as shown in FIGS. 7A and 7B, threshold Dth is set lower than in the short-distance routine to enable detection of the waveform of the reflected light. Then, mask time is set so as to include at least a period when internal stray light appears. When timing for the detection signal to exceed threshold Dth is included in the mask time, timing for receiving light is not detected at the timing.

Which of the detection result of timing for receiving light by the long-distance routine and the detection result of timing for receiving light by the short-distance routine to use for distance measurement is selected based on which detection result seems more reliable as timing for receiving light from the object. For example, as a method for determine this reliability, it is possible to use a method for performing each of the long-distance routine and the short-distance routine for multiple times in one measurement operation and determining that timing for receiving light detected by the routine with the larger total number of detected timing for receiving light is more reliable as timing for receiving light from the object. Note that other determination methods other than this method may be used as the method for determining the reliability.

A specific configuration of distance measurement using the long-distance routine and the short-distance routine will be described below.

Figure 8:
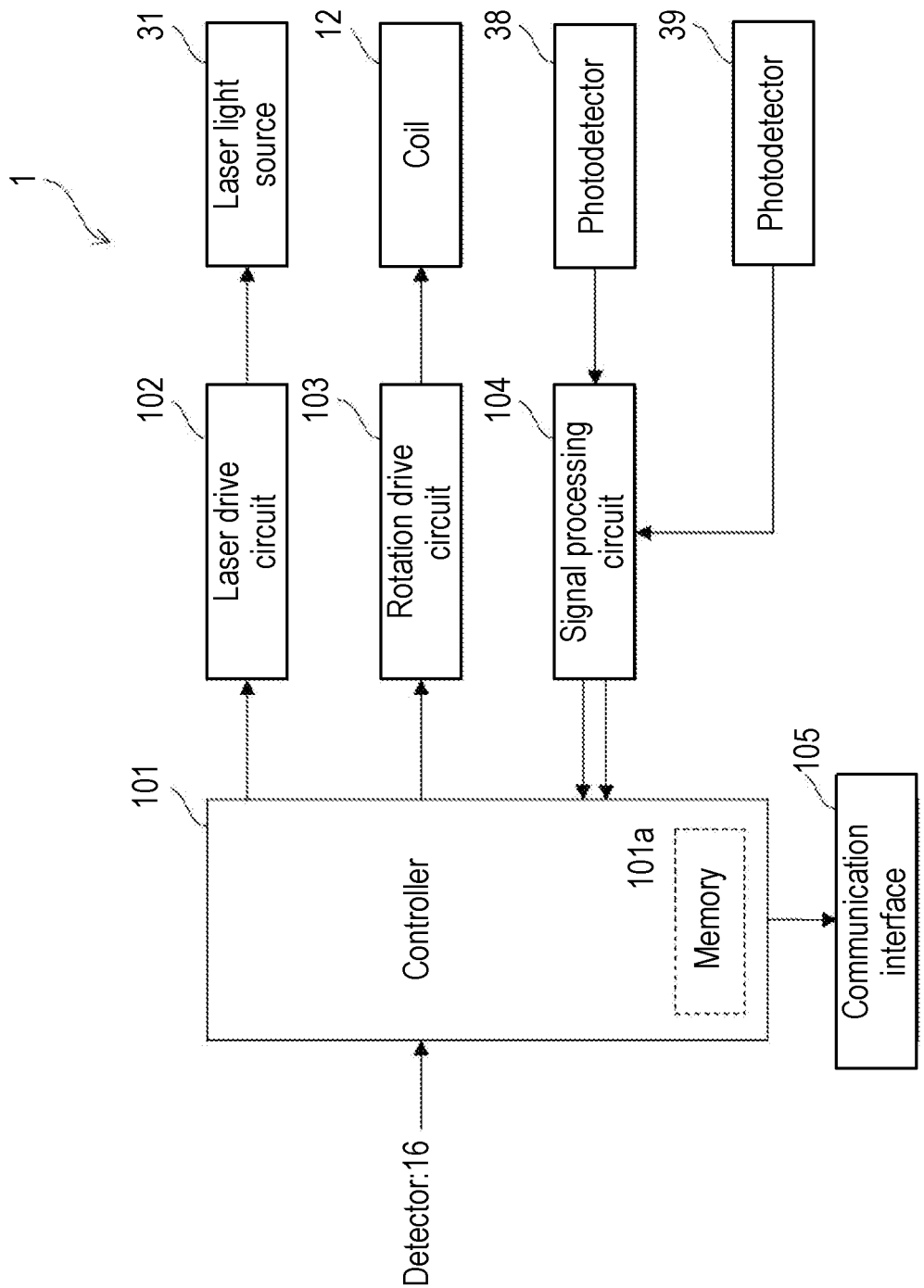
FIG. 8 is a circuit block diagram showing the configuration of the distance measurement device according to the exemplary embodiment.

FIG. 8 is a circuit block diagram showing the configuration of distance measurement device 1.

As shown in FIG. 8, distance measurement device 1 includes controller 101, laser drive circuit 102, rotation drive circuit 103, and signal processing circuit 104 as components of a circuit part.

Controller 101 includes an arithmetic processing circuit such as a central processing unit (CPU) and memory 101a, and controls components in accordance with a predetermined control program. Laser drive circuit 102 drives laser light source 31 in response to control by controller 101. Rotation drive circuit 103 allows coils 12 to conduct a current in response to the control by controller 101. For example, controller 101 controls rotation drive circuit 103 in a manner that rotating part 20 rotates at a predetermined rotational speed based on a pulse signal input from detector 16. In response to this control, rotation drive circuit 103 adjusts quantity of the current that coils 12 is allowed to conduct and conduction timing.

Signal processing circuit 104 performs processes such as amplification on the detection signal input from photodetector 38 and outputs a resultant signal to controller 101. Besides the amplification process, signal processing circuit 104 may perform processes such as smoothing for smoothing a high-frequency component and extracting a low-frequency component on the detection signal. Furthermore, signal processing circuit 104 also performs processes such as amplification on the detection signal from photodetector 39 and outputs a resultant signal to controller 101.

Communication interface 105 is used for communication with apparatuses in which distance measurement device 1 is installed. Via communication interface 105, various commands such as instructions of start and end of distance measurement are input into controller 101 from the apparatuses.

Figure 9A:
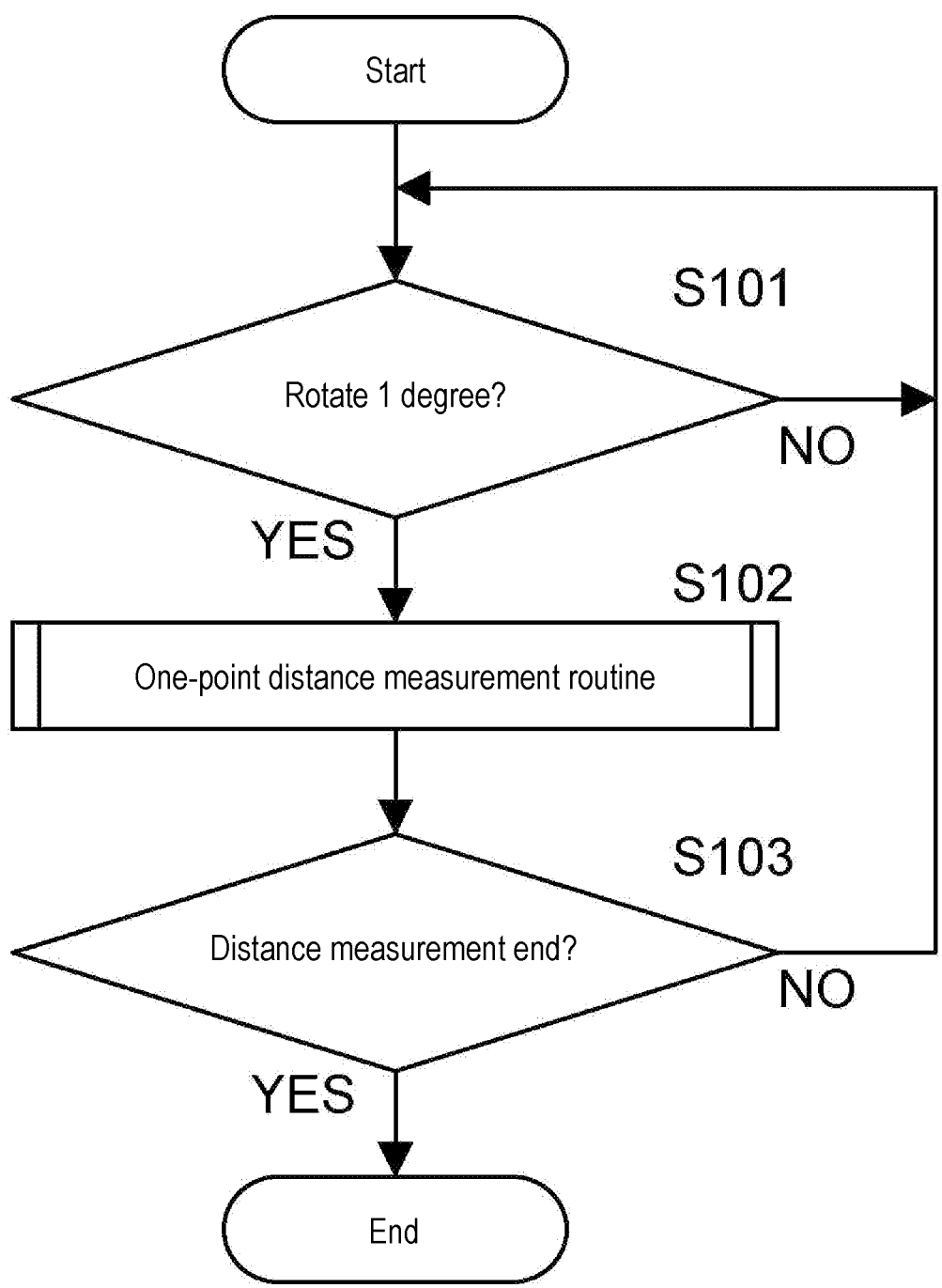
FIG. 9A is a flowchart showing a basic routine of a distance measurement process according to the exemplary embodiment.

FIG. 9A is a flowchart showing a basic routine of a distance measurement process. Here, distance measurement is performed every time rotating part 20 rotates 1 degree.

When a distance measurement operation starts, controller 101 determines whether rotating part 20 has rotated 1 degree (S101). When rotating part 20 has rotated 1 degree (S101: YES), controller 101 performs the distance measurement process at this angular position (hereinafter referred to as "one-point distance measurement routine") (S102). When the one-point distance measurement routine is completed, controller 101 determines whether an instruction to end the distance measurement has been received via communication interface 105 (S103). In this way, until receiving the instruction to end the distance measurement (S103:YES), every time rotating part 20 rotates 1 degree (S101:YES), controller 101 repeatedly performs the one-point distance measurement routine (S103).

Figure 9B:
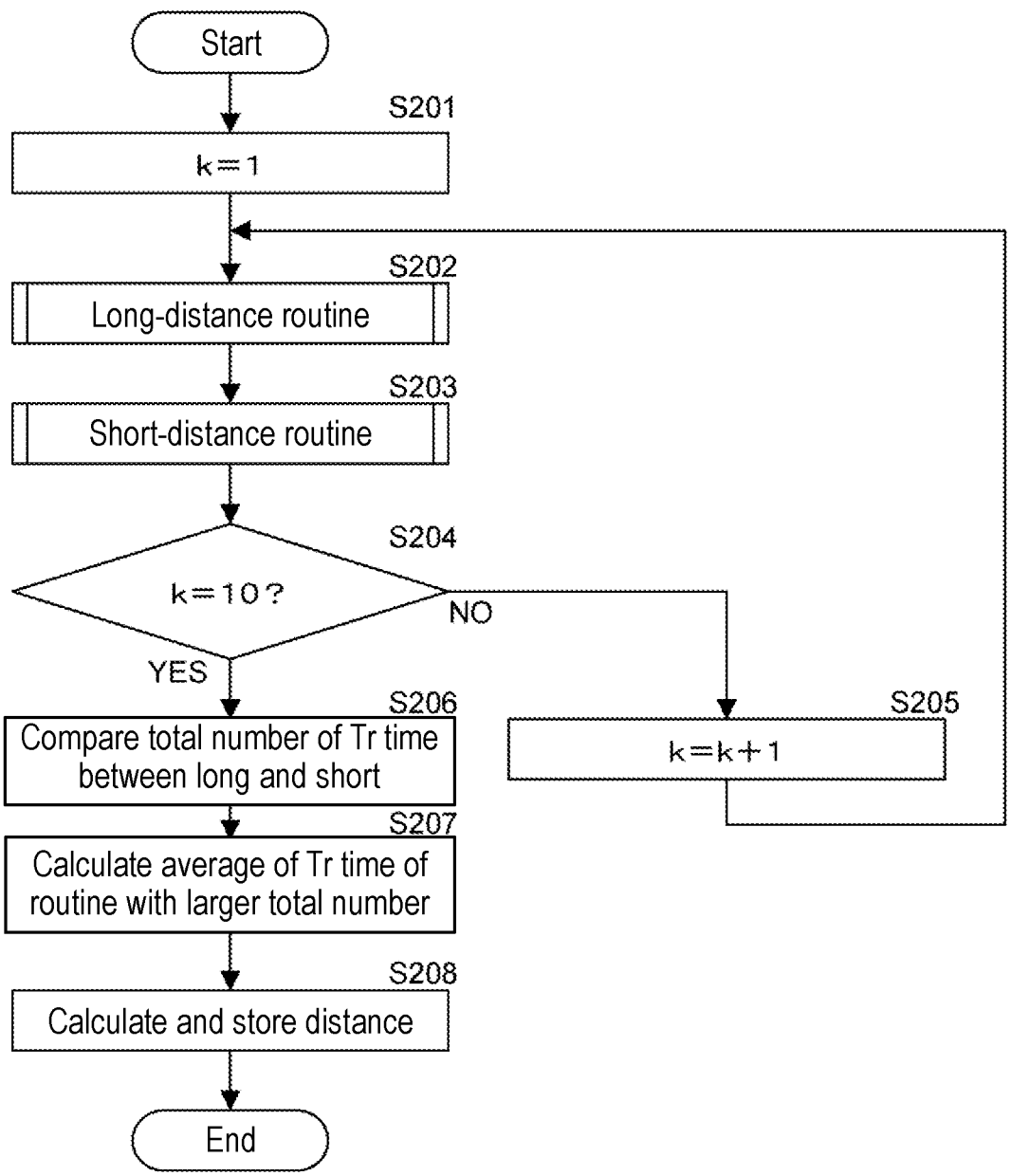
FIG. 9B is a flowchart showing a one-point distance measurement routine according to the exemplary embodiment.

FIG. 9B is a flowchart showing the one-point distance measurement routine (S102) shown in FIG. 9A.

Controller 101 sets 1 in variable k (S201), and then performs the long-distance routine and the short-distance routine shown in FIGS. 7A, 7B, and 7C (S202, S203).

Controller 101 determines whether variable k has reached 10 (S204). If variable k has not reached 10 (S204:NO), controller 101 adds 1 to variable k (S205), and performs the long-distance routine and the short-distance routine again (S202, S203). In this way, the long-distance routine and the short-distance routine are repeatedly performed 10 times.

Figure 10A:
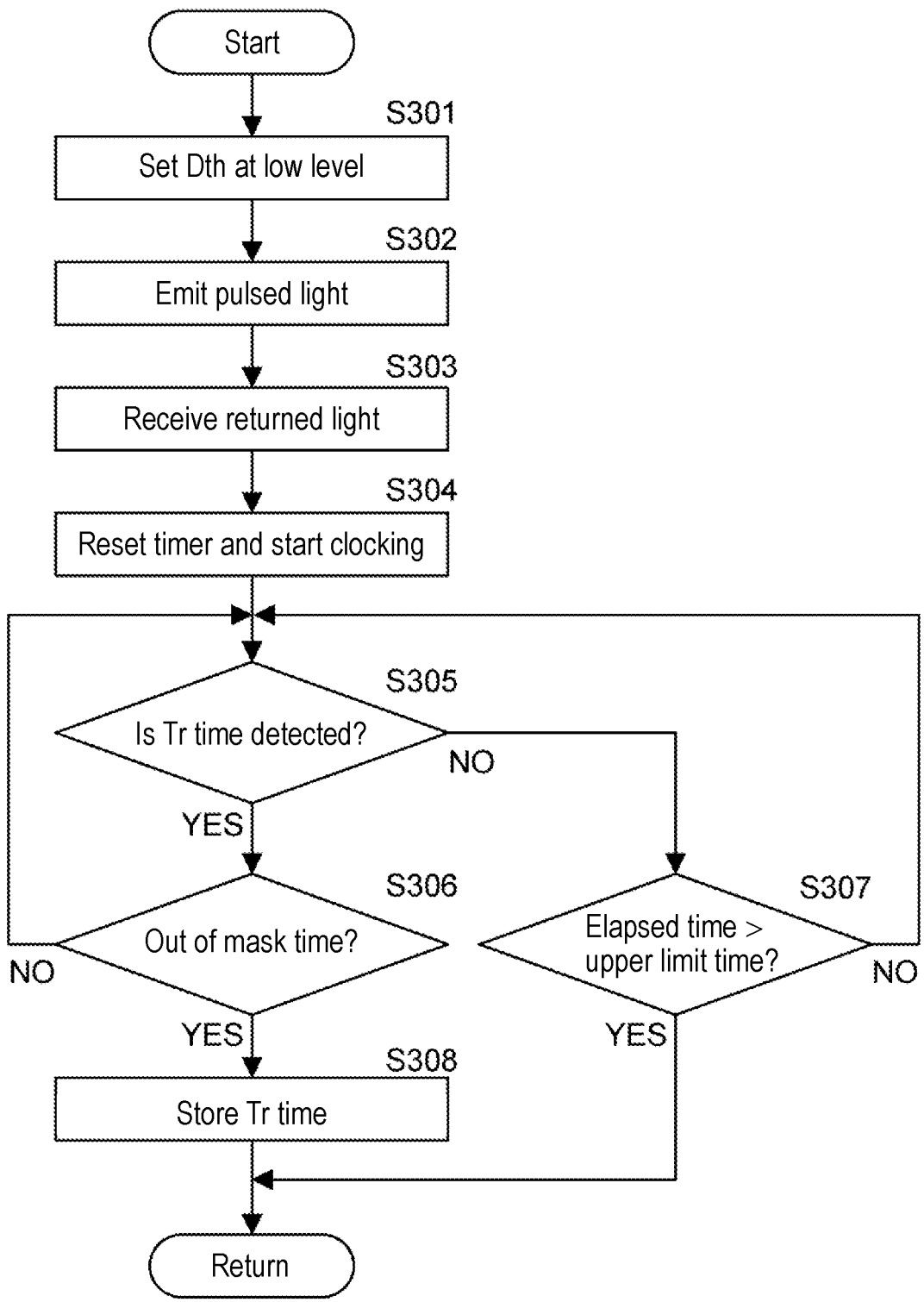
FIG. 10A is a flowchart showing the long-distance routine according to the exemplary embodiment.
Figure 10B:
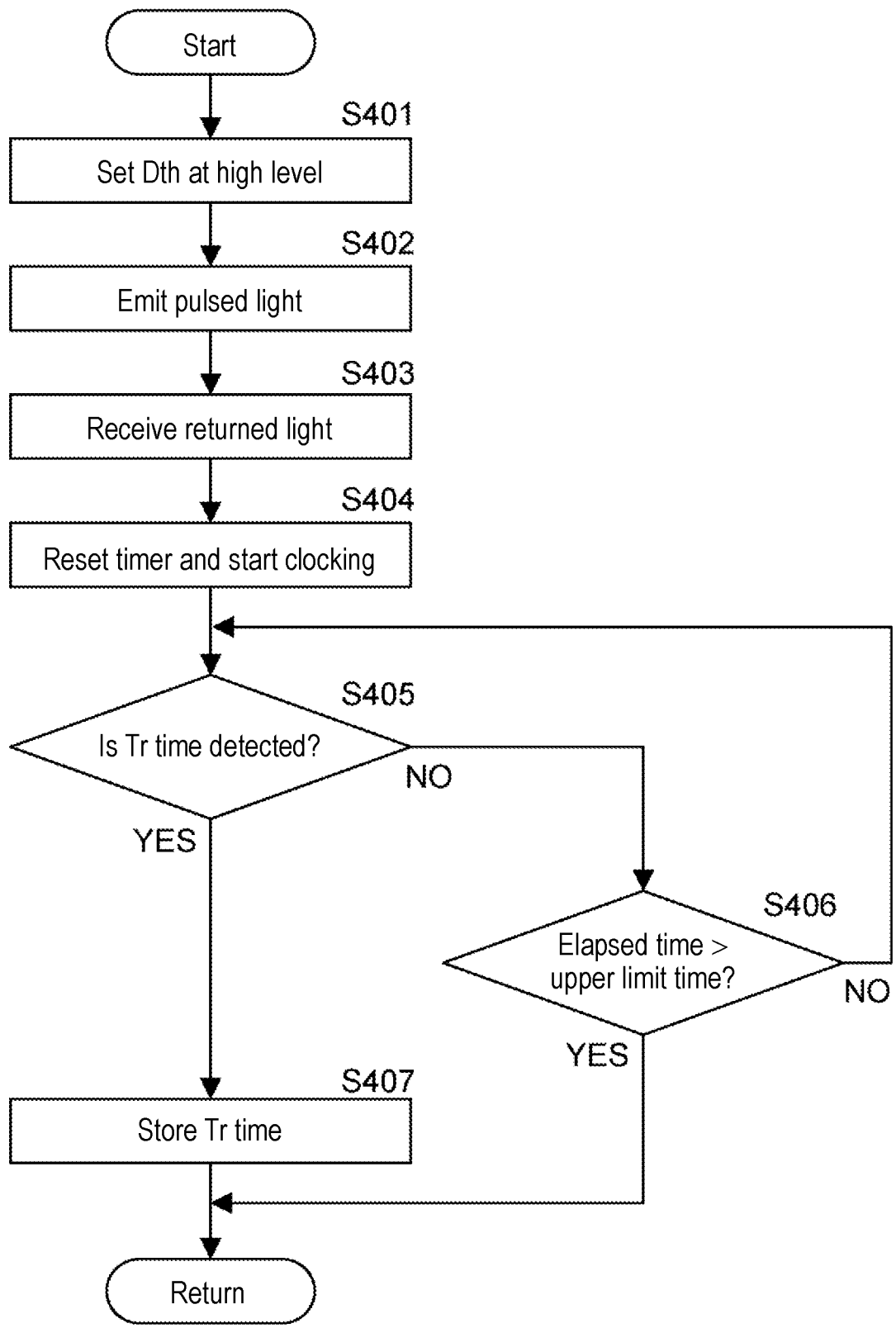
FIG. 10B is a flowchart showing the short-distance routine according to the exemplary embodiment.

FIGS. 10A and 10B are flowcharts showing the long-distance routine and the short-distance routine (S202, S203) shown in FIG. 9B, respectively.

First, with reference to FIG. 10A, the long-distance routine will be described. Controller 101 sets threshold Dth at a low level (S301), and causes laser light source 31 to emit pulsed light (S302). In the present exemplary embodiment, laser light source 31 emits one light pulse as projection light. The projection light is received by photodetector 39 immediately after the light pulse emission, and photodetector 38 outputs the detection signal. Upon receipt of the detection signal from photodetector 39 (S303), controller 101 resets an internal timer to zero and starts clocking (S304).

Subsequently, controller 101 determines whether timing when the detection signal from photodetector 38 exceeds threshold Dth in an increasing direction (hereinafter referred to as "Tr time") has been detected (S305). When the Tr time is detected (S305:YES), controller 101 determines whether the detected Tr time is included in a time range other than the mask time shown in FIGS. 7A and 7B (S306). When the Tr time is included in the mask time (S306:NO), controller 101 neglects this Tr time and continues detection of the Tr time (S305).

In parallel with detection of the Tr time, controller 101 determines whether elapsed time after clocking is started in step S304 has reached upper limit time (S307). Here, the upper limit time is set at elapsed time corresponding to the maximum value of a distance range where distance measurement device 1 is to perform distance measurement. For example, the upper limit time is set at 150 ns shown in FIG. 6A. In this case, the maximum value of the distance range where distance measurement device 1 is to perform distance measurement will be about 20 m (velocity of light×150 ns).

In this way, controller 101 continues detection of the Tr time (S305) until the elapsed time reaches the upper limit time (S307:YES). Then, when controller 101 detects the Tr time outside the mask time (S305:YES, S306:YES) by the time the elapsed time reaches the upper limit time (S307:YES), controller 101 stores the detected Tr time in memory 101a (S308), and ends the long-distance routine. On the other hand, when controller 101 fails to detect the Tr time outside the mask time (S305:NO, S306:NO) by the time the elapsed time reaches the upper limit time (S307:YES), controller 101 ends the long-distance routine without storing the Tr time in memory 101a.

Next, with reference to FIG. 10B, the short-distance routine will be described. In the short-distance routine, compared with the long-distance routine, step S401 differs and step S306 in the long-distance routine is omitted.

Controller 101 sets threshold Dth at a high level (S401). Threshold Dth at this time is higher than threshold Dth in the long-distance routine, as shown in FIGS. 7A, 7B, and 7C. Subsequently, controller 101 causes laser light source 31 to emit pulsed light as the projection light by a similar process to steps S302 to S304 of the long-distance routine, and starts clocking by the timer (S402 to S404).

Then, controller 101 continues detection of the Tr time until the elapsed time reaches the upper limit time (S405, S406). When the Tr time is detected (S405:YES), controller 101 stores the detected Tr time in memory 101a (S407) and ends the short-distance routine. On the other hand, when controller 101 fails to detect the Tr time (S405:NO) by the time the elapsed time reaches the upper limit time (S406: YES), controller 101 ends the short-distance routine without storing the Tr time in memory 101a.

Returning to FIG. 9B, controller 101 repeats the above-described long-distance routine and the short-distance routine 10 times (S202 to S205), and acquires the Tr time in each of the long-distance routine and the short-distance routine. Then, controller 101 compares the total number of acquired Tr time between the long-distance routine and the short-distance routine (S206). Controller 101 uses the Tr time acquired in the routine with the larger total number for calculation of timing for receiving the reflected light. For example, when the total number of Tr time acquired in the long-distance routine is eight, and the total number of Tr time acquired in the short-distance routine is one, controller 101 uses the Tr time acquired in the long-distance routine for calculation of timing for receiving the reflected light.

Controller 101 calculates an average of the Tr time acquired in the routine with the larger total number, and sets this average as timing for receiving the reflected light (S207). Then, controller 101 calculates the distance to the object present in the distance measurement area with the calculated timing for receiving light as a time difference between reception of the pulsed light and reception of the reflected light. Controller 101 then stores the calculated distance in memory 101a as the distance at this angular position (S208).

Subsequently, controller 101 repeats the process of steps S101 and S102 until the instruction to end distance measurement is received in step S103 shown in FIG. 9A. In this way, when the instruction to end distance measurement is received (S103:YES), controller 101 ends the distance measurement process.

Effects of Exemplary Embodiment

As described above, the exemplary embodiment produces the following effects.

As shown in FIG. 9B, in one distance measurement operation (one-point distance measurement routine), controller 101 performs the long-distance routine and the short-distance routine. Then, controller 101 selects one of the detection result of timing for receiving light (Tr time) in the long-distance routine and the detection result of timing for receiving light (Tr time) by the short-distance routine. Based on the selected detection result, controller 101 calculates the distance to the object irradiated with the projection light. Thus, since one of the detection result of the long-distance routine and the detection result of the short-distance routine is selected and the distance to the object is calculated, the distance to the object can be appropriately detected regardless of the distance.

At this time, controller 101 performs each of the long-distance routine and the short-distance routine 10 times during one distance measurement operation (one-point distance measurement routine). Controller 101 selects the detection result (Tr time) of the routine with the larger number of detection of timing for receiving light (Tr time) as the detection result for distance calculation. Thus, by determining the detection result calculated by which routine seems more reliable as timing for receiving the reflected light with the total number of the detection result (Tr time), it is possible to select the detection result to be used for measurement accurately and efficiently by a simple process.

As shown in steps S207 and S208 of FIG. 9B, controller 101 calculates the distance to the object with the average of the detection result of the routine with the larger total acquisition number of the Tr time as timing for receiving the reflected light. Thus, by setting the average of the detection result as timing for receiving light, it is possible to acquire timing for receiving light appropriately by a simple process.

As shown in steps S301 and S306 of FIGS. 7A, 7B, and 10A, in the long-distance routine, controller 101 sets threshold Dth to be applied to the detection signal in order to detect timing for receiving light lower than in the short-distance routine. Controller 101 then performs a mask process for excluding a change in the detection signal caused by internal stray light based on the projection light entering photodetector 38, from timing at which timing for receiving light is to be detected. Specifically, in the mask process, controller 101 sets the mask time so as to include at least a period when internal stray light appears, and if timing when the detection signal exceeds the threshold (Tr time) is included in the mask time, controller 101 excludes the timing (Tr time) from timing at which timing for receiving light is to be detected. Accordingly, even weak reflected light produced from the object at a long distance can be distinguished from internal stray light, and timing for receiving light can be acquired appropriately and accurately.

As shown in step S307 of FIG. 10A and step S406 of FIG. 10B, in the long-distance routine and the short-distance routine, if controller 101 fails to detect timing for receiving the reflected light (Tr time) by the time the elapsed time after the projection light is projected reaches the upper limit time corresponding to the maximum value of the distance range in which distance measurement is to be performed, controller 101 ends the long-distance routine and the short-distance routine. This makes it possible to avoid useless measurement operations outside the distance measurement range. Furthermore, by setting the same upper limit time in the long-distance routine and the short-distance routine, it is possible to uniformize the reference for comparison of the total number in step S206 of FIG. 9B between the long-distance routine and the short-distance routine, and it is possible to appropriately determine that the detection result acquired by which routine is more reliable as timing for receiving the reflected light.

Note that in the exemplary embodiment, as shown in FIG. 9B, the short-distance routine (S203) is performed after the long-distance routine (S202) is performed, but the exemplary embodiment is not limited to this example. For example, the long-distance routine and the short-distance routine may be performed in parallel.

Modifications

In addition to the configuration of distance measurement device 1 described in the exemplary embodiment described above, various modifications can be made.

For example, in the exemplary embodiment described above, as shown in FIG. 9B, each of the long-distance routine and the short-distance routine are repeated 10 times; however, the repeat count of the long-distance routine and the short-distance routine is not limited to this example. As the repeat count of the long-distance routine and the short-distance routine increases, the difference between the total number of the detection result (Tr time) by the long-distance routine and the total number of the detection result (Tr time) by the short-distance routine increases. Therefore, it is possible to determine the detection result by which routine corresponds to timing for receiving the reflected light more accurately. However, as the repeat count of the long-distance routine and the short-distance routine increases, the time needed for collecting the Tr time increases, resulting in an increase in a processing load and an increase in a memory capacity. Therefore, the repeat count of the long-distance routine and the short-distance routine is preferably set at an appropriate count by taking these elements into consideration comprehensively.

In step S207 of FIG. 9B, the average of the Tr time acquired by the routine with the larger total number of detected Tr time has been determined as timing for receiving the reflected light; however, the value to be determined as timing for receiving the reflected light is not limited to the average. For example, the value to be determined as timing for receiving light may be calculated by a calculation method that better reflects an imbalance on a time axis of the Tr time acquired by the routine with the larger total number of Tr time.

In the exemplary embodiment described above, as showed in FIG. 9A, every time rotating part 20 rotates 1 degree, the one-point distance measurement routine is performed; however, timing for performing the one-point distance measurement routine is not limited to this example. For example, the one-point distance measurement routine may be performed every time rotating part 20 rotates 0.5 degrees, and the angular position at which the one-point distance measurement routine is performed may be set as appropriate under predetermined rules.

The exemplary embodiment described above has a configuration in which controller 101 performs the process of the one-point distance measurement routine of FIG. 9B, but may have a configuration in which another circuit part is responsible for some process of the one-point distance measurement routine. For example, the exemplary embodiment may have a configuration in which signal processing circuit 104 of FIG. 8 is responsible for the detection process of the Tr time in the one-point distance measurement routine, and the detected Tr time is transmitted from signal processing circuit 104 to controller 101. In this case, signal processing circuit 104 also performs the clocking process as in steps S304 and S404 of FIGS. 10A and 10B, and determines in steps S305 and S405 whether controller 101 has received the Tr time from signal processing circuit 104. Thus, when another circuit part is responsible for some process of the one-point distance measurement routine, it is interpreted that controller 101 and this circuit part constitute the controller described in the claims.

In the exemplary embodiment described above, timing when photodetector 39 that receives the projection light immediately after emission receives the projection light, that is, timing when photodetector 39 outputs the detection signal is set as a starting point of the elapsed time and the Tr time. However, timing for causing laser light source 31 to emit pulsed light, that is, timing when a drive signal for laser light source 31 rises in pulses may be set as the starting point of the elapsed time and the Tr time. In this case, however, considering a time lag after laser light source 31 is driven until laser light is actually emitted, it is necessary to construct a distance calculating process so as to acquire the time difference between light-emitting timing and light-receiving timing and to calculate the distance. In this way, when timing for causing laser light source 31 to emit pulsed light is set as the starting point of the elapsed time and the Tr time, photodetector 39 shown in FIG. 3 can be omitted, achieving simplified configurations and reduction in costs.

The configuration of the optical system and a mechanism of distance measurement device 1 is not limited to the configuration shown in FIGS. 1 to 3. For example, in the exemplary embodiment described above, the motor obtained by combining the plurality of coils 13 and the plurality of magnets 22 arranged in the circumferential direction rotates rotating part 20. However, a mechanism obtained by combining stepping motors and gears may rotate rotating part 20. The projection light does not necessarily need to rotate, and for example, a configuration in which the projection light moves linearly in a direction perpendicular to the projection direction, or a configuration in which the projection light does not move may be used.

In addition, various modifications can be made to the exemplary embodiment of the present disclosure as appropriate within the scope of the technical idea disclosed in the claims.

What is claimed is:

1. A distance measurement device comprising:
   a light source that emits projection light for distance measurement;
   a photodetector that receives reflected light generated by reflection from a distance measurement area;
   a housing; and
   a controller,
   the light source and the photodetector are disposed inside of the housing, and
   wherein the controller:
   causes the photodetector to measure an intensity of an internal stray light and a period of the internal stray light, wherein the internal stray light is caused by a part of the projection light being reflected inside the housing without being emitted to the distance measurement area;
   performs a long-distance routine that detects timing of receiving light from a long-distance object that is located at a longer distance from the photodetector and a short-distance routine that detects timing of receiving light from a short-distance object that is located at a shorter distance from the photodetector which is shorter than the longer distance, based on a detection signal output from the photodetector during one distance measurement operation, wherein a first threshold in the long-distance routine is lower than a second threshold in the short-distance routine, the second threshold being higher than the intensity of the internal stray light, and each of the first and second thresholds is applied to the detection signal in order to detect the timing of receiving light, and in the long-distance routine, a mask process that excludes internal stray light that enters the photodetector from the detecting the timing of receiving light is performed;
   selects one of a detection result of the timing for receiving light by the long-distance routine and a detection result of the timing for receiving light by the short-distance routine; and
   calculates the distance to the object irradiated with the projection light based on the selected one of the detection results.

2. The distance measurement device according to claim 1, wherein
   during the one distance measurement operation, the controller performs each of the long-distance routine and the short-distance routine for a plurality of times, and selects detection results of a routine having a larger number of detection results among the long-distance routine and the short-distance routine, the selected detection results each being the selected one of the detection results for the calculation.

3. The distance measurement device according to claim 2, wherein
   the controller calculates the distance to the object using an average of the selected detection results as the timing for receiving the reflected light.

4. The distance measurement device according to claim 1, wherein
   in the mask process, the controller sets mask time to include at least a period in which the internal stray light appears, and when timing for the detection signal exceeds the first threshold in the mask time, the controller excludes the timing for the detection signal from the timing for receiving light.

5. The distance measurement device according to claim 1, wherein
   in each of the long-distance routine and the short-distance routine, when the controller fails to detect the timing for receiving the reflected light until elapsed time after the projection light is projected reaches upper limit time corresponding to a maximum value of a distance range in which the distance measurement is to be performed, the controller ends the each of the long-distance routine and the short-distance routine.

6. The distance measurement device according to claim 1, wherein:
   the housing comprises a fixed part and a rotating part, and
   the rotating part is supported by fixed part so as to be rotatable about a rotating axis.

* * * * *